United States Patent
Tao et al.

(10) Patent No.: US 7,027,699 B2
(45) Date of Patent: Apr. 11, 2006

(54) OPTICAL FIBER AND OPTICAL FIBER SENSORS

(75) Inventors: Xiaoming Tao, Kowloon (HK); Jianming Yu, Kowloon (HK); Dongxiao Yang, Kowloon (HK)

(73) Assignee: The Hong Kong Polytechnic University, Hong Kong (CN)

( * ) Notice: Subject to any disclaimer, the term of this patent is extended or adjusted under 35 U.S.C. 154(b) by 0 days.

(21) Appl. No.: 10/442,570

(22) Filed: May 21, 2003

(65) Prior Publication Data
US 2004/0234218 A1    Nov. 25, 2004

(51) Int. Cl.
G02B 6/02    (2006.01)
G02B 6/34    (2006.01)

(52) U.S. Cl. ........................................ 385/126; 385/37

(58) Field of Classification Search ............... 385/12, 385/13, 37, 123, 126

See application file for complete search history.

(56) References Cited

U.S. PATENT DOCUMENTS

| | | | |
|---|---|---|---|
| 4,715,876 A | 12/1987 | Osaka et al. | |
| 4,788,686 A | 11/1988 | Mentel | |
| 5,111,525 A | 5/1992 | Hartouni | |
| 5,144,690 A | 9/1992 | Domash | |
| 5,170,450 A | 12/1992 | Dahlgren | |
| 5,563,967 A * | 10/1996 | Haake | 385/12 |
| 5,594,823 A | 1/1997 | Tardy et al. | |
| 6,089,044 A | 7/2000 | Hardy et al. | |
| 6,154,594 A | 11/2000 | Fiacco et al. | |
| 6,160,943 A | 12/2000 | Davis et al. | |
| 6,389,187 B1 * | 5/2002 | Greenaway et al. | 385/13 |
| 6,563,968 B1 * | 5/2003 | Davis et al. | 385/12 |
| 6,826,343 B1 * | 11/2004 | Davis et al. | 385/126 |

* cited by examiner

Primary Examiner—Sung Pak
Assistant Examiner—Omar Rojas
(74) Attorney, Agent, or Firm—Alix, Yale & Ristas, LLP

(57) ABSTRACT

An optical fiber device has at least two cores within the same cladding having different characteristics. The characteristics include including strain optic coefficient, thermo-optic coefficient, thermal expansion coefficient, photo-sensitivity and refractive index. One or more cores can have a Bragg grating.

1 Claim, 11 Drawing Sheets

OPTICAL FIBER AND OPTICAL FIBER SENSORS

BACKGROUND TO THE INVENTION

1. Field of the Invention

The invention relates to optical fibers and to optical fiber sensors. The invention also relates to fabrication methods for optical fibers and to coupling methods.

2. Background Information

Fiber-optic technologies offering both sensing and signal transmission functions have attracted considerable attention in recent years, especially in smart concrete structures including highways, bridges, dams and buildings. Also, since optical fiber Bragg grating (FBG) sensors are of small size and light weight compared to textile yarns, and are readily embedded or ever woven inside textiles, they are the most promising sensor for smart textiles.

Optical fiber Bragg grating sensor comprises an optical fiber with a grating formed transversely across it by exposing the fiber to UV irradiation. The grating produces a differing refractive index within the core of the optical fiber. When light wave propagates along the core, part of the spectrum is reflected by the grating. The reflected wavelength ($\lambda$) is known as the Bragg wavelength ($\lambda_B$). The Bragg wavelength varies with events and conditions that the optical fiber is exposed to. In particular, the Bragg wavelength will vary with changes in temperature (T) and when the optical fiber is subjected to some form of strain (S). The equation for this change in Bragg wavelength is $$\frac{\Delta \lambda_B}{\lambda_B} = C_{11} * S_L + C_{12} * \Delta T$$

where the constants $C_{11}$ and $C_{12}$ are functions of Poisson's ratio $$\left(\frac{S_T}{S_L}\right)$$

and strain-optic coefficient, and thermo-optic coefficient and thermal expansion coefficient respectively.

The sensor will react to two types of strain: compression of the fiber in the transverse direction ($S_T$) and strain of the fiber in the longitudinal direction ($S_L$).

One of the most significant limitations of FBG sensors is their dual sensitivity to both strain (S) and temperature (T). This leads to difficulty in the independent measurement of these two measurands. To overcome this problem two FBG sensors, having different grating types, are located in close proximity. This arrangement reveals two equations.

$$\frac{\Delta \lambda_1}{\lambda_1} = C_{11} * S_L + C_{12} * \Delta T$$

$$\frac{\Delta \lambda_2}{\lambda_2} = C_{21} * S_L + C_{22} * \Delta T$$

The above equations can be solved simultaneously to reveal the individual measurands. However, care must be taken when placing the two FBG sensors to ensure that they are subjected to exactly the same strain and temperature conditions.

SUMMARY OF THE INVENTION

It is an object of the present invention to provide an optical fiber and optical fiber sensor that can be applied for the measurement of multiple parameters.

According to a first aspect of the invention there is provided an optical fiber device comprising a cladding and at least two cores provided in the cladding and spatially disposed in the cladding to prevent the crossover of light between them, each core having a characteristic including strain optic coefficient, thermo-optic coefficient, thermal expansion coefficient, photo-sensitivity and refractive index, wherein the characteristic of each core is different from the other core. These differences are achieved by control of chemical composition and molecular orientation.

According to a second aspect of the invention there is provided an optical fiber device comprising:
  a first core for guiding light having a first grating therein,
  a second core for guiding light having a second grating therein, and
  a cladding surrounding the first core and second core, the cladding having a value of refractive index lower than the first core and second core, the first and second cores being spatially disposed within the cladding to prevent the crossover of light between them.

Preferably, the device includes third and forth cores disposed within the cladding, the third and forth cores having third and forth gratings respectively.

Preferably, the first core is disposed at the center of the cladding and the second, third and forth cores are located at the vertices of an equilateral triangle concentric with the first core.

According to a third aspect of the invention there is provided an optical fiber device comprising a flat ribbon of glass or polymeric material having a plurality of light guiding cores arranged in at least two rows, the cores made of glass or polymeric with a higher refractive index compared with cladding in the flat ribbon and having a grating thereon, and wherein the cores have differing optical characteristics.

According to a forth aspect of the invention there is provided a method for fabricating an optical fiber including
  forming a plurality of cores on the inside a polymeric cladding to form an intermediate preform,
  stretching the intermediate preform to reduce its external diameter,
  adding cladding material on the outside of the intermediate preform to form a final preform,
  drawing the final preform into a fiber.

Preferably the method includes exposing linearly spaced regions of the fiber to UV irradiation to produce spaced apart regions of differing refractive index within the plurality of cores.

Preferably, the core-to-cladding ratio of the intermediate preform is greater than that of the final preform.

Preferably, the cores are formed to meet the single mode condition.

Preferably, the perform diameter is between 13 and 15 mm.

According to a fifth aspect of the invention there is provided a method of increasing the light coherence and energy density of a laser including the steps of:
  generating a collinear laser beam,
  passing the laser beam through a horizontally elongate aperture,
  diverging the laser beam in the vertical direction, and
  converging the laser beam in the horizontal direction.

Preferably, the laser beam is diverged and converged by plano-cylindrical lenses.

Further aspects of the invention will become apparent from the following description, which is given by way of example only.

BRIEF DESCRIPTION OF THE DRAWINGS

Embodiments of the invention will now be described with reference to the accompanying drawings in which.

DESCRIPTION OF THE PREFERRED EMBODIMENTS

Figure 1:
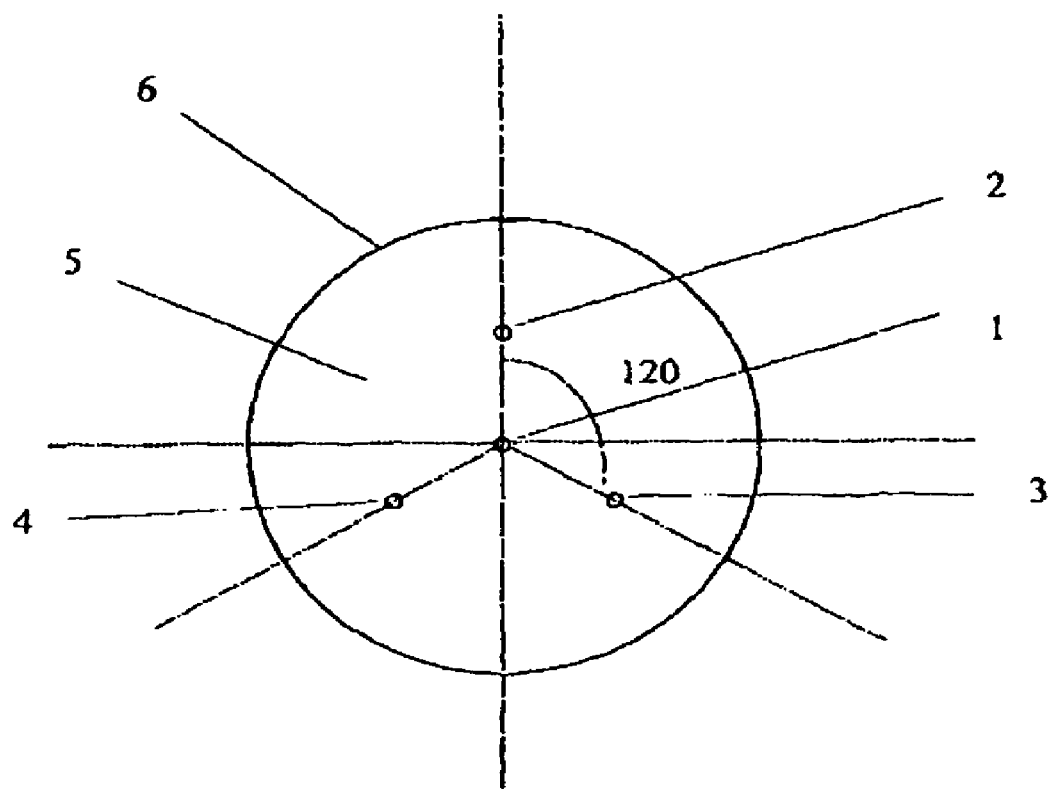
FIG. 1 is a cross-sectional view of a polymeric optical fiber according to the invention.

Referring to FIG. 1, in a first embodiment of the invention a polymeric optical fiber 6 comprises four light guiding cores 1, 2, 3 and 4 located in a common cladding 5. The first core 1 lies in the center of the cladding 5. The other three cores 2, 3 and 4 lie at 120 degrees intervals equidistant from first core 1. The distances between the cores 1, 2, 3 and 4 is large enough to avoid any mode coupling between them.

Figure 2:
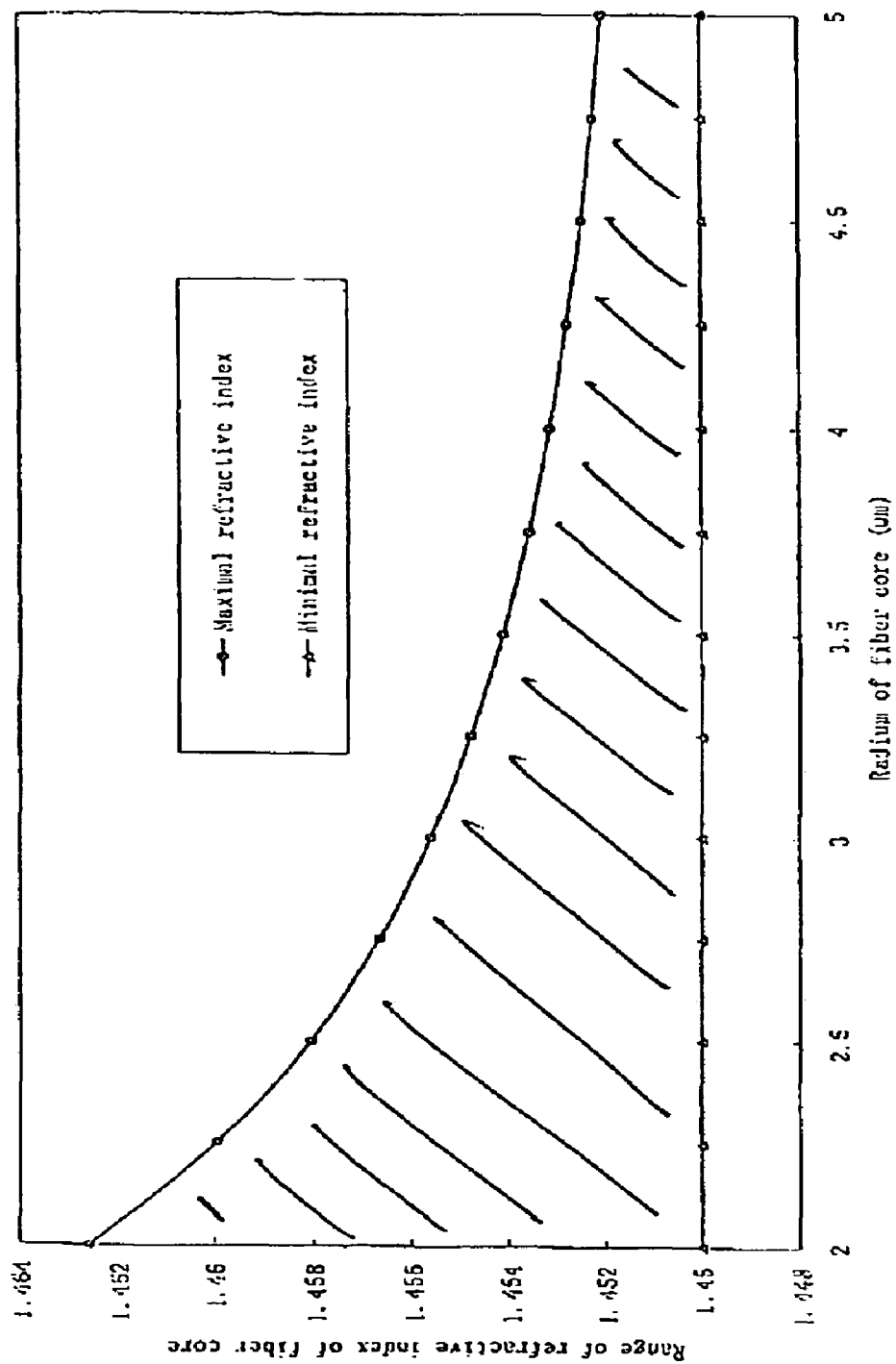
FIG. 2 is a view of a range of refractive index of a fiber core limited by single mode condition with a cladding refractive index of 1.45.

The refractive indexes of the cores 1, 2, 3 and 4 are larger than the refractive index of the cladding 5, but smaller than the value which depends on the single mode operation. Typically, the core radium of single-mode fibers is about $3.5 \times 10^{-4}$ inches or 9 microns in diameter. FIG. 2 is a graph of a range of refractive indexes for single mode fiber cores in a cladding with a refractive index of 1.45. For single mode operation the refractive index of a core must lie in the shaded region of the graph between the curves. According to FIG. 2, a large increase in the suitable range of refractive index of a core can be obtained with small reductions in the radium of the core.

Fiber gratings are fabricated in each core 1, 2, 3, 4 by masked exposure to intensive UV pulse in known manner. The chemical compositions and molecular configurations of the cladding 5 and each core 1, 2, 3, 4 have different photo-sensitivities to the UV laser, or different refractive indexes, or different photo-elasticities or different theo-optic coefficients to give different transmitting/reflective spectra to the grating sensor in each core 1, 2, 3, 4. These designed optical properties of the cores 1, 2, 3, 4 can be realized by choosing suitable starting monomers for the preform and adjusting the composition.

The fiber 6 can be fabricated via a two-step process of making a preform and drawing, or a single step of co-extrusion.

FIGS. 3 to 6 illustrate the steps in making a polymeric optical fiber 6 comprises four light guiding cores 1, 2, 3 and 4 located in a common cladding 5. The steps include forming an initial preform 70, drawing the initial preform 70 into an intermediate preform 71, adding cladding to the intermediate preform 71 to form a final perform 72, and drawing the final perform 72 to a fiber 6.

The ratio of core size to surrounding cladding thickness of final preform 72 should 8–125 microns, the same a common silica based single mode fibers. The smallest distance between the cores 1, 2, 3, 4 and between outer cores 2, 3, 4 and the outside brim of cladding 5 should ensure that this ratio of core diameter to its cladding thickness is maintained.

Figure 4:
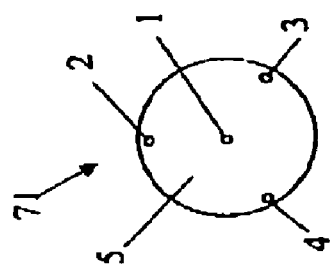
Figure 3:
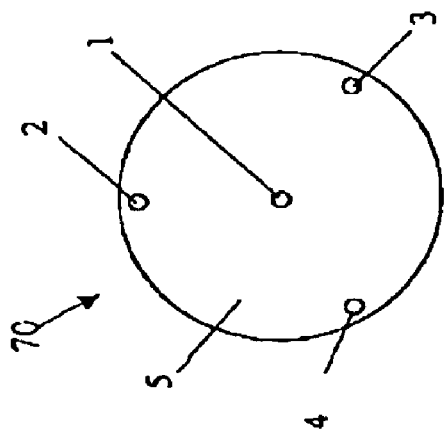

For polymer based optical fiber, the initial preform 70 is made by bulk polymerization of selected monomers in a glass tube with a diameter ranging from 13 to 15 millimetres. Using a known technology, cladding polymer is formed with 4 cylinder holes at the positions shown in FIG. 3 and then core polymer is formulated inside the cladding holes. Using this method the smallest core diameter in the initial preform 70 is at least 0.8 mm. To meet the required ratio of core diameter to cladding thickness for each core the preform would be too thick to be drawn into the final fiber product 6. Thus, the initial preform 70 is fabricated with insufficient cladding 5 thickness meaning the outer cores 2, 3, 4 are near the outer surface of the cladding 5 as shown in FIG. 3. The initial preform 70 is small enough in diameter to be drawn, under heat, to reduce its diameter and to produce an intermediate preform 71 as shown in FIG. 4.

Figure 6:
FIGS. 3 to 6 illustrate the steps in a first method of fabricating multi-core optical fibers.
Figure 5:
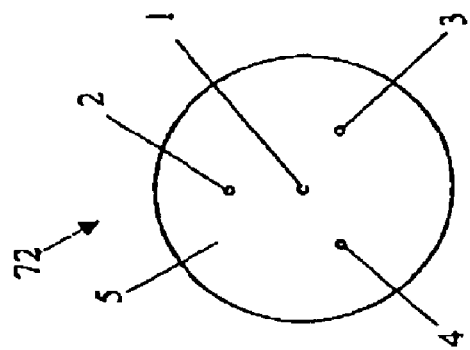

After the first drawing additional cladding 5 is added to the intermediate preform 71 by polymerization of cladding-forming monomers until the realization of the designed core positions and cladding thickness produce the final preform 72. The final preform 72 is small enough to be drawn into the final fiber 6 as shown in FIG. 6.

The preform is drawn by holding it vertically and heating it at the temperature above its molten temperature until its tip melts and falls down by gravity. As the melting preform tip is drawn it cools and forms a fiber. As the preform continues to melt and to be stretched the fiber is wound onto the spool.

Figure 7:
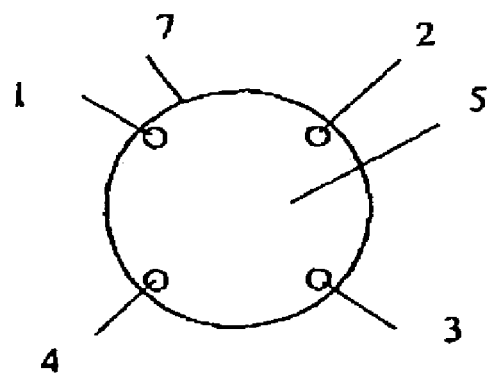
FIG. 7 is a cross-sectional view of an initial preform of a second polymeric optical fiber.

Referring to FIG. 7, in an alternative embodiment an optical fiber with square distribution of the core positions is made from this initial preform 7 according to the above method.

Figure 8:
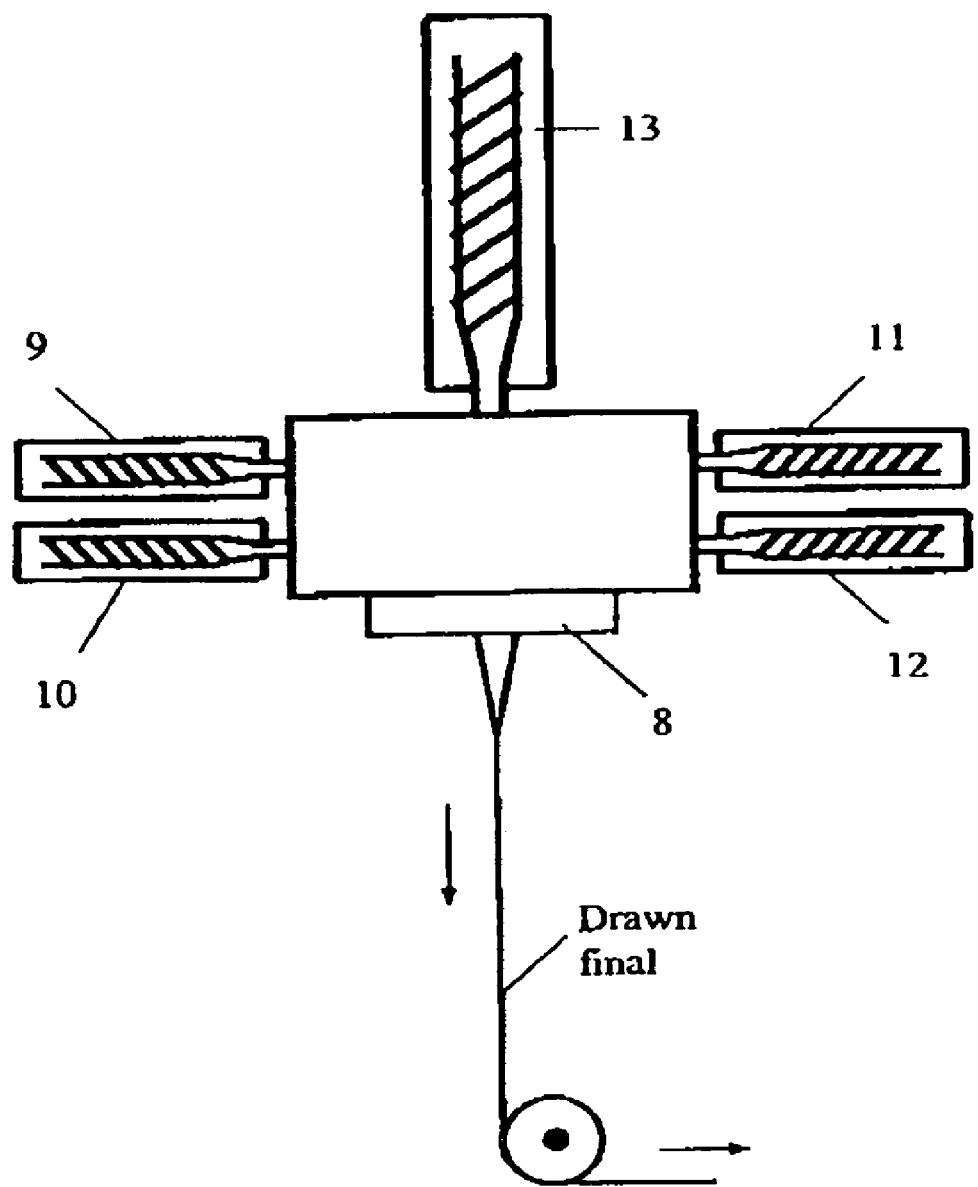
FIG. 8 illustrates a second example of method of fabricating multi-core optical fibers.

Referring to FIG. 8, an optical fiber can be fabricated by coextrution. The polymeric chips for the cores 1, 2, 3, 4 and cladding 5 in the fiber are melted and co-extruded thorough a spinneret 8. Four extruders 9, 10, 11, 12 connected to spinneret 8 are used for melt-extruding the cores 1, 2, 3, 4 with designed geometrical formation. A fifth extruder 13 is utilised as a feed for cladding 5. The size and geometrical distribution of the four cores 1, 2, 3, 4 is confined by the spinneret 8 profile. The respective extruder for each core 1, 2, 3, 4 and cladding 5 polymer makes sure that each core 1, 2, 3, 4 has different optical parameters such as refractive index, photo-sensitivity, and photo-elasticity. Other affecting factors, such as orientation of chain segment, other than chemical structure, may play a role in adjusting the photo-elasticity of the cores 1, 2, 3, 4 since the process condition of respective extruder for each core material is able to be easily modulated. This efficient process facilitates extremely high drawing speeds.

Figure 9:
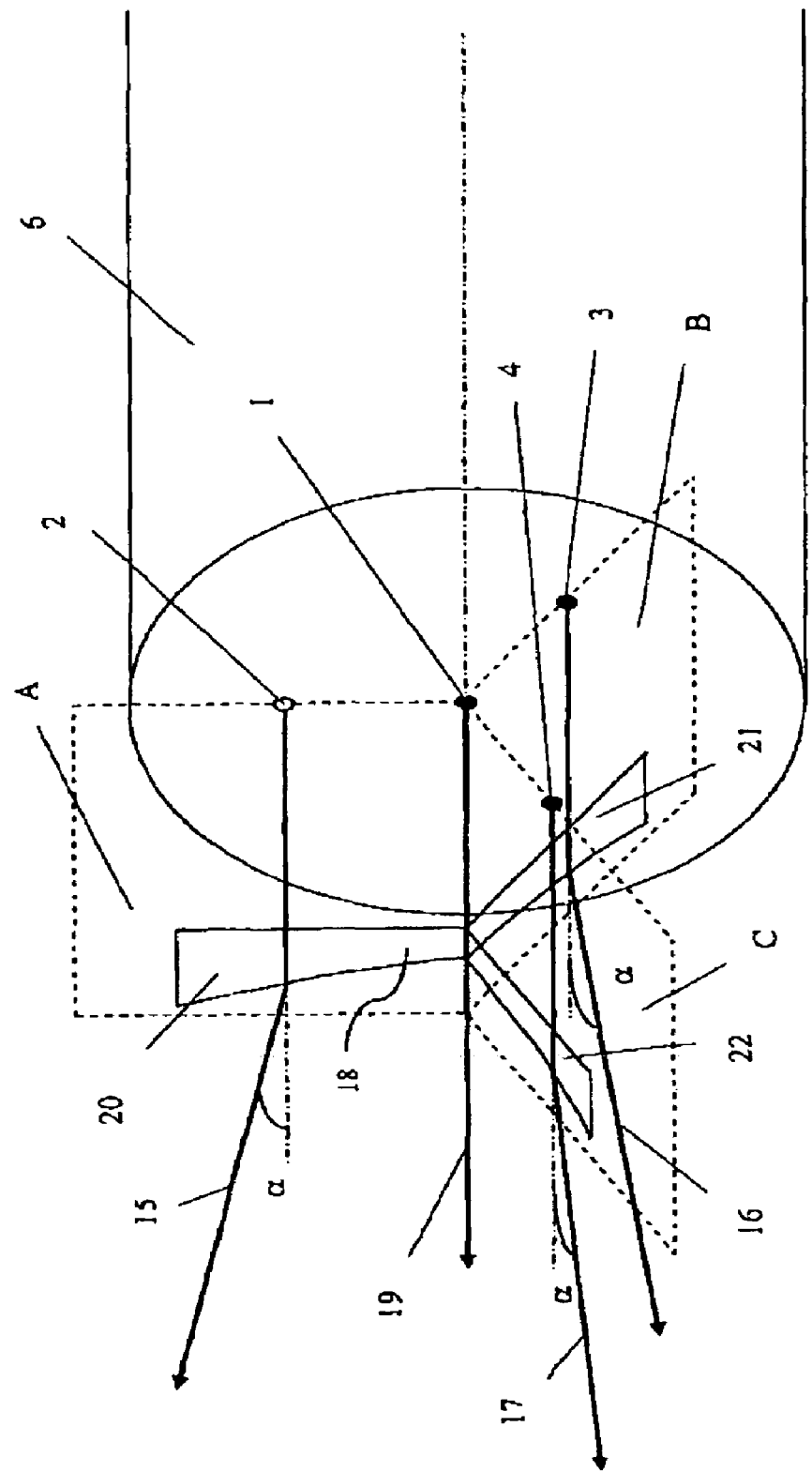
FIG. 9 is a schematic view of the directional separation of light beams from a multi-core optical fiber using a plano-concave lens.

In order to inject and extract light from the multiple cores of the fiber a coupling device is required. In the preferred embodiment the coupling device comprises a refractive plano-concave lens as sown in FIG. 9. The axes 15, 16, 17 of light beams from side-cores 2, 3, 4 of the single mode fiber 6 are separated by the plano-concave lens 18. The axis 19 of the light beam from central-core 1 is not changed by the plano-concave lens 18. The axis 15 of the light beam from side-core 2 and the axis 19 of the light beam from the central-core 1 lie in a first plane A. The axis 16 of the light beam from side-core 3 and the axis 19 of the light beam from the central-core 1 lie in a second plane B. The axis 17 of the light beam from side-core 4 and the axis 19 of the light beam from the central-core 1 lie in a third plane C. The planes A, B, C are used to illustrate the direction separation of the light beams from cores 1, 2, 3, 4 of the fiber 6 by the plano-concave lens 18. The intersections 20, 21, 22 of the lens 18 lie on the first, second and third planes A, B, C respectively. The axes of the outer light beams 15, 16, 17 change direction at the meet-points of their axes and the concave of the lens portions 20, 21, 22. The direction changes have the same angle α. The axes of the outer light beams 15, 16, 17 before and after the lens lie their respective planes A, B, C.

The light beams from different cores 1, 2, 3, 4 of the single mode optical fiber are separated in different directions by the plano-concave lens 18. A detector array (not shown) can be arranged in suitable position on a plane or on a spherical surface to measure the optical signals, such as optical spectrum and optical intensity. The detector array can be substituted by a detector equipped with a movable positioner and timing sequence controller.

Figure 10:
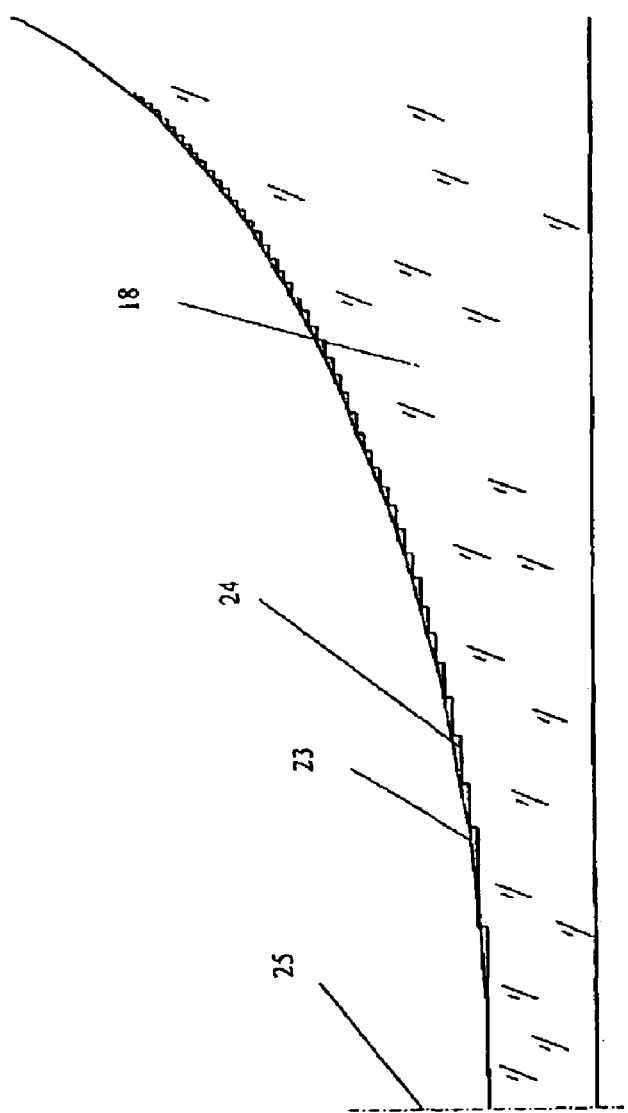
FIG. 10 is a part of the meridional profile of the plano-concave lens and the corresponding digitized meridional profile by the step of $\lambda/8$.

FIG. 10 shows a part of meridional profile 23 of the plano-concave refractive lens 18 which is composed of glass. The plano-concave refractive lens 18 can be a digitized meridional profile 24 with the digitizing step of $\lambda/8$, where $\lambda$ is the wavelength of the light in glass. The axis 25 of the plano-concave lens 18 corresponds with the axis 19 of the light beam from the central-core 1.

Figure 11:
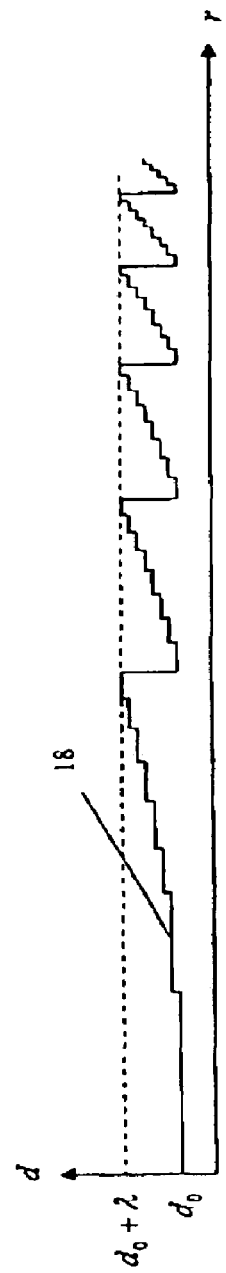
FIG. 11 is a part of the meridional profile of the corresponding digital diffractive plano-concave lens with eight-levels.

FIG. 11 is a thickness profile of the digital diffractive plano-concave lens 26 having eight phase levels, which is corresponding to the plano-concave refractive lens 18. It is fabricating in known manner by multiple mask projection and subsequent etching of the glass. Symbols d and r represent the thickness of the digital diffractive plano-concave lens 26 and the radial coordinate in cylindrical coordinate system respectively. Symbol $d_0$ is the minimal thickness of the surface-relieved substrate. The difference of maximal thickness and minimal thickness of the surface-relieved substrate is the wavelength of the light in the substrate material.

Figure 12:
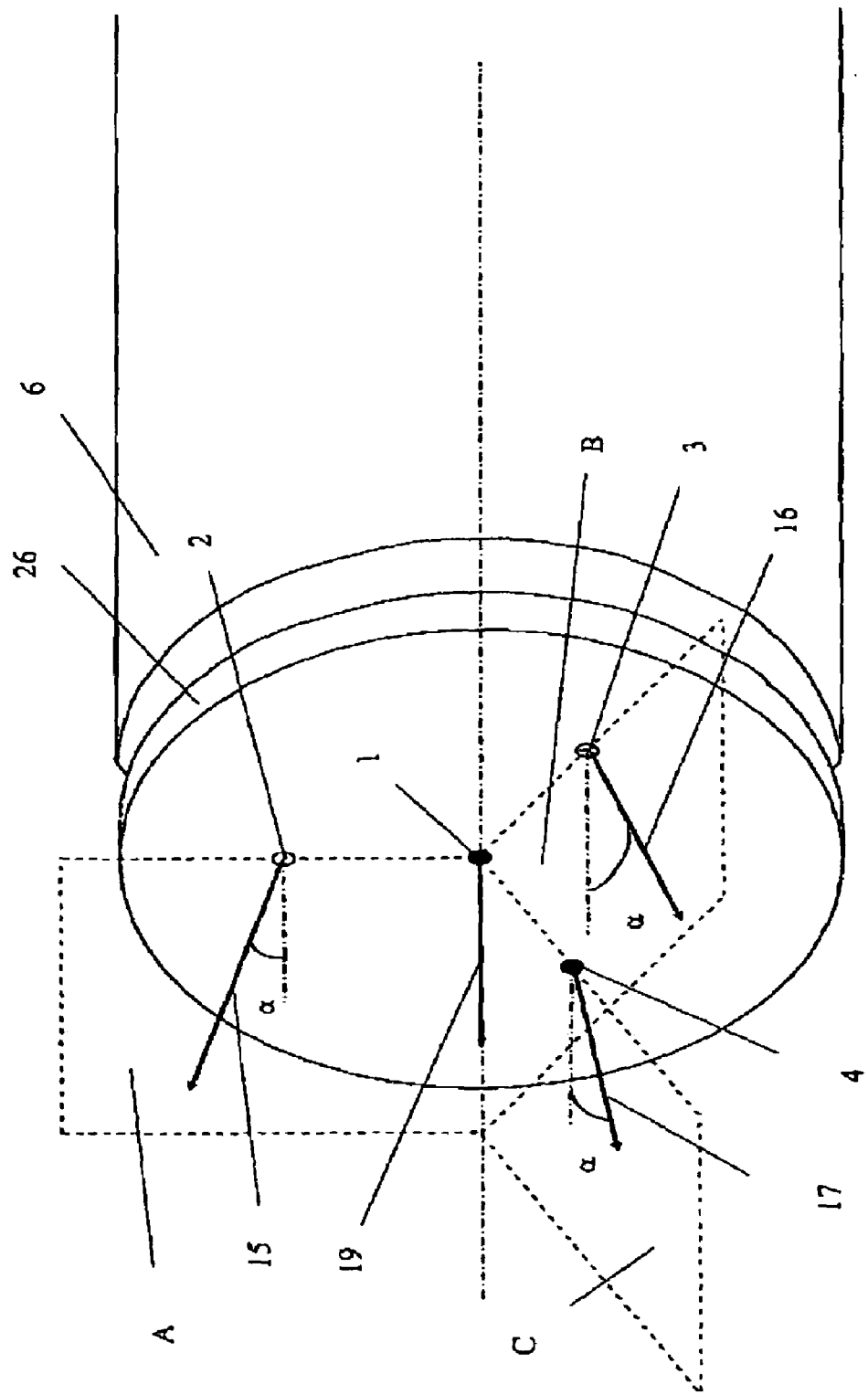
FIG. 12 is a schematic view of the directional separation of light beams from a multi-core optical fiber using a digital diffractive optical concave lens.

Referring to FIG. 12, in an alternatively embodiment the light beams from the cores 1, 2, 3, 4 can be separated by a digital diffractive optical concave lens 26. The axes 15, 16 and 17 of light beams from side-cores 2, 3 and 4 of the optical fiber 6 are separated by a digital diffractive optical concave lens 26. The digital diffractive optical concave lens 26 does not change the axis 19 of the light beam from central-core 1. The axis 15 of the light beam from side-core 2 and the axis 19 of the light beam from the central-core 1 lie in the section plane A. The axis 16 of the light beam from side-core 3 and the axis 19 of the light beam from the central-core 1 lie in the section plane B. The axis 17 of the light beam from side-core 4 and the axis 19 of the light beam from the central-core 1 lie in the section plane C. These section planes A, B, C are used to illustrate the direction separation of the axes 15, 16, 17 and 19 of the light beams from the optical fiber 6 by the digital diffractive optical concave lens 26. These direction changes have the same angle α. The axes of the outer light beams 15, 16, 17 before and after the lens lie their respective section planes A, B, C. The diffractive optical concave lens 26 can be fabricated with the same radium as that of polymeric optical fiber 6.

Figure 13:
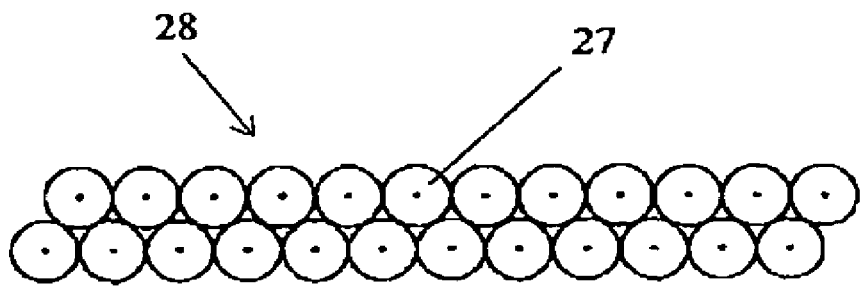
FIGS. 13 and 14 illustrate a cross-sectional view of a second embodiment of a composed ribbon bonded by single core optical fibers according to the invention.
Figure 14:
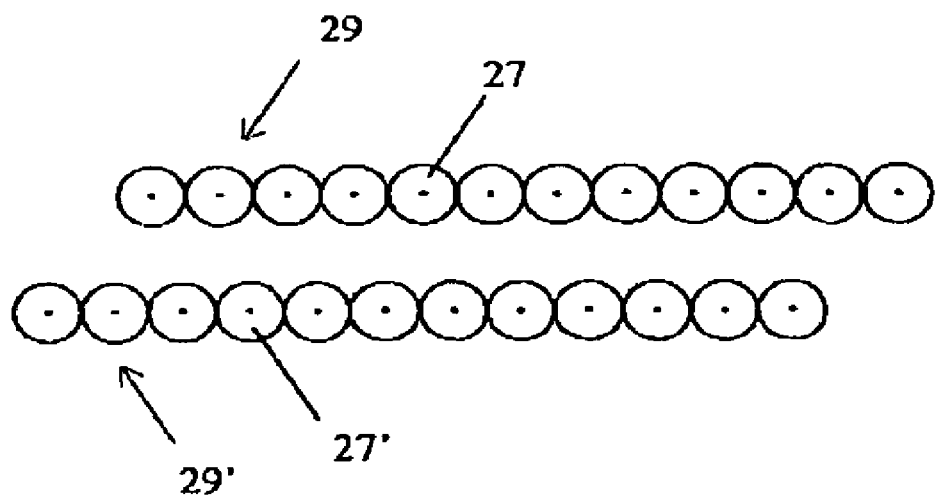

Referring to FIG. 13, in an alternative embodiment of the optical fiber, single-core optical fibers 27 with different optical properties are arranged and bound to form a ribbon shaped optical fiber array 28. Each single-core optical fiber 27 is fabricated by drawing a single core preform in known manner. Referring to FIG. 14, the single-core optical fibers 27 are then bonded into a ribbon 29 using cladding material either in the molten liquid or in concentrated solution of easily volatile organic solvent. Two ribbons 29 combined in the manner of the core position in one ribbon located in the middle part of cores in other ribbon to form the array 28. The array can have any number of single-core optical fibers 27, such as four or six, each with different optical properties.

Figure 15:
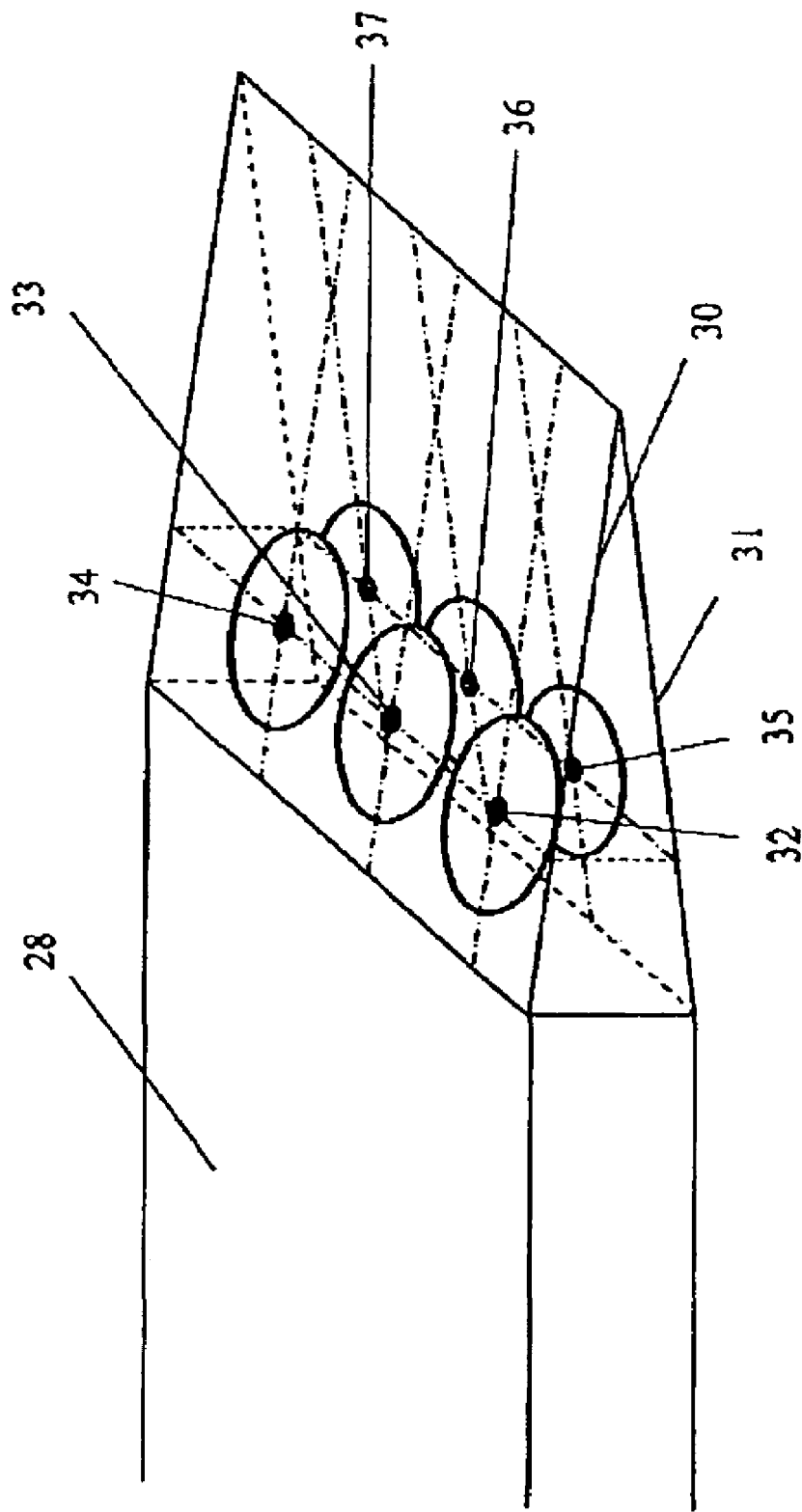
FIG. 15 is a schematic view of polished output ends of optical fiber type shown in FIG. 13.

Referring to FIG. 15, the fiber output ends of the array 28 are polished to an obliquely angle having an upper polished surface 30 and the lower polished surface 31 in order to separate the directions of the light beams from the upper and lower fiber layers of the ribbon 28. The single core fibers 32, 33, 34 of the upper layer are at the upper surface 30, and the single core fibers 35, 36, 37 of the lower layer are at the lower surface 31.

Figure 16:
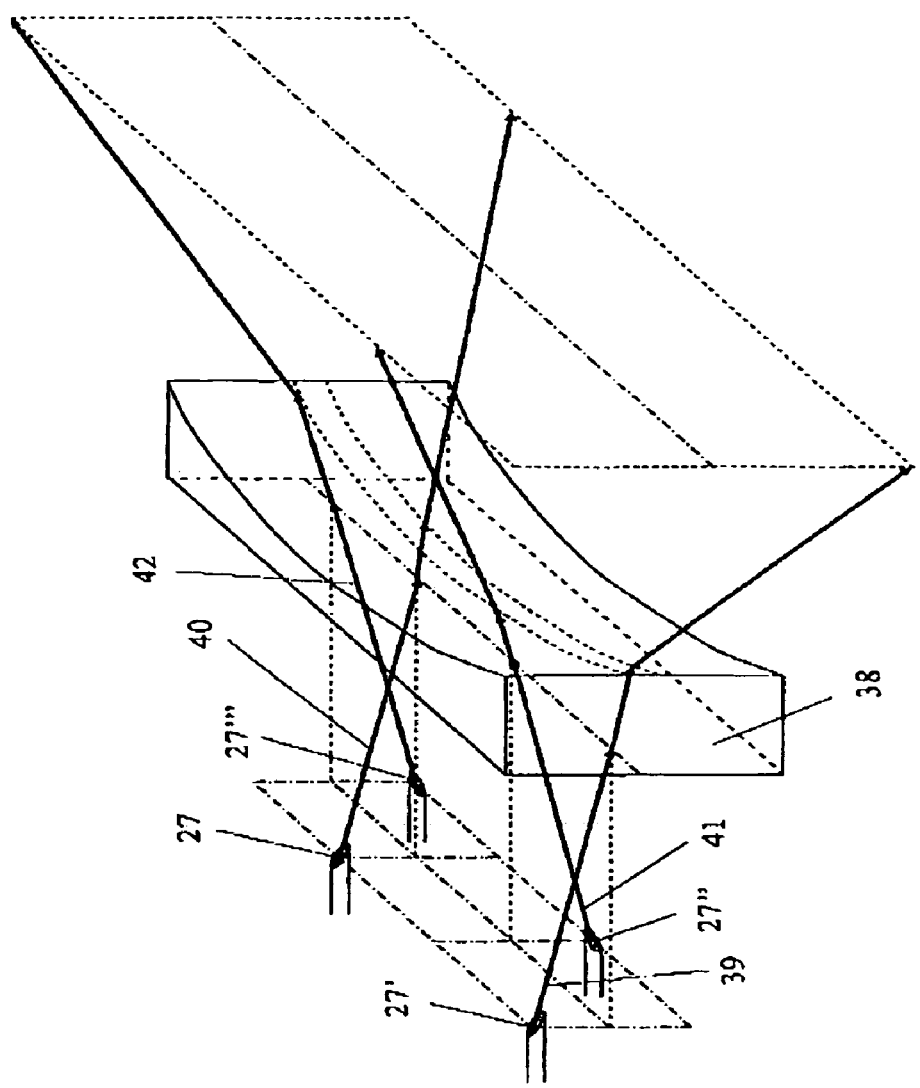
FIG. 16 is a schematic view of the direction separation of light beams from a optical fiber type shown in FIG. 13 by a plano-concave lens and obliquely-polishing the output ends of the optical fibers.

Referring to FIG. 16, the light beams from a polished four-fiber array 28 are separated by a plano-concave cylindrical lens 38. The light beams 39 and 40 from the polished fibers in the upper layer are refracted down by the oblique angle of the fiber end. The light beams 41 and 42 from the polished fibers in the lower layer are refracted up by the oblique angle of the fiber end. This vertically separates the beam axes 39, 40, 41, 42. The directions of the beam axes 39, 40, 41, 42 are horizontally separated by the plano-concave cylindrical lens 38. A detector array can be arranged in suitable position on a plane or on a special surface to measure the optical signals, such as optical spectrum and optical intensity. This detector array can be substituted by a detector equipped with a movable positioning equipment and timing sequence controller.

The fabrication of Bragg gratings in the fiber 6 is achieved by an UV pulse laser and a phase mask in known manner. If the diffractive light property is not good enough, a Sagnac interferometer is also used in the optical system.

Figure 17:
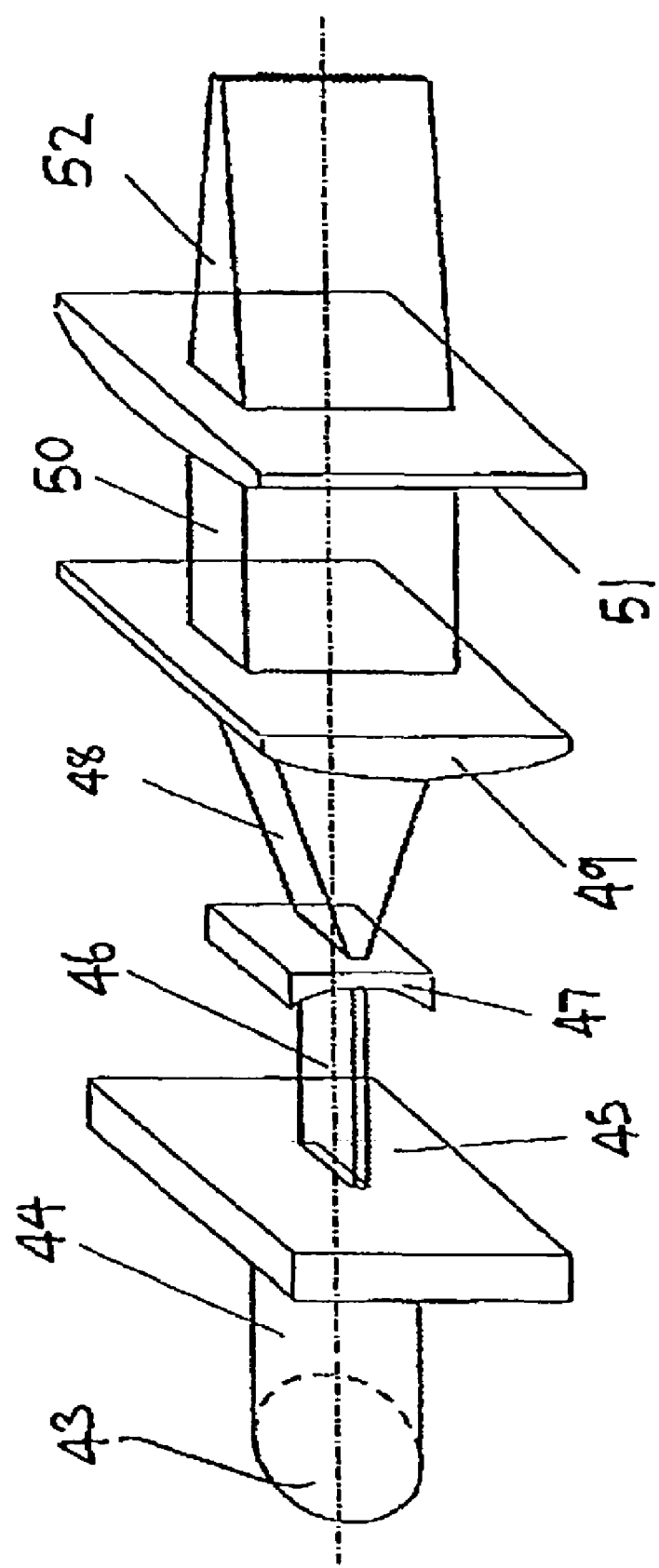
FIG. 17 is a schematic view of an optical system for increasing light energy density and light coherence of an UV laser beam.

Referring to FIG. 17, an optical system for increasing light energy density and light coherence of an UV laser beam is shown. A laser beam 44 is irradiated from a laser (not shown) with a cross-section 43. The collimated laser beam 44 is filtered in space by a horizontally elongate aperture 45. The coherent property of the filtered laser beam 46 is better than that of original beam 44. This collimated laser beam 46 is diverged in the vertical direction by a plano-concave cylindrical lens 47. This diverged laser beam 48 is converged and recollimated in the vertical direction by a plano-convex cylindrical lens 49 which has the same focus position as concave cylindrical lens 47. The vertically collimated and magnified laser beam 50 is converged in the horizontal direction by a plano-convex cylindrical lens 51. The horizontally converged and vertically collimated and magnified laser beam 52 has higher spatial coherence in the vertical direction and higher energy density than 44. These improvements of the laser beam improve the fabrications of optical fiber gratings.

Where in the foregoing description reference has been made to integers or elements having known equivalents then such are included as if individually set forth herein.

Embodiments of the invention have been described, however it is understood that variations, improvements or modifications can take place without departure from the spirit of the invention or scope of the appended claims.

What is claimed is:

1. An optical fiber device comprising:
a cladding having a center,
a first light guiding core located at the center of the cladding and having a first grating,
a second light guiding core located in the cladding and having a second grating,
a third light guiding core located in the cladding and having a third grating, and
a fourth light guiding core located in the cladding and having a fourth grating, wherein the second, third and fourth cores are located at the vertices of an equilateral triangle concentric with the first core and the cladding has a value of refractive index lower than the cores and the cores are spatially disposed within the cladding to prevent the crossover of light between them.

* * * * *